Fig. 5. RELATION BETWEEN pH AND DILUTION OF MOLAR PHOSPHATE SOLUTION WITH pH 5.0, 5.7 AND 7.0 WATER.

Fig. 6. RELATION BETWEEN pH AND DILUTION OF MOLAR PHTHALATE SOLUTION WITH pH 5.0 WATER.

Patented Nov. 7, 1939

2,178,550

UNITED STATES PATENT OFFICE 2,178,550

METHOD OF DETERMINING pH AND BUFFERS AND INDICATORS THEREFOR

Solomon F. Acree, Washington, D. C.

Application May 2, 1929, Serial No. 359,930
Renewed January 14, 1939

10 Claims. (Cl. 23—230)

The present invention comprises a stable hydrogen ion standard (i. e., H-ion) known as sodium acid ortho phthalate, which is at the same time an excellent buffer; and it comprises compositions thereof with indicators adjusted in hydrogen ion concentration, and with other buffers. It comprises especially solutions thereof and pH comparisons therewith made with superpure water of practically pH 7.0 such as I prepare free from carbon dioxide and traces of buffer compounds by my process in a special type of still.

In the developments and use of the improved types of hydrogen-calomel electrode systems described in another application Ser. No. 624,277 it was necessary to employ a new hydrogen ion standard in one hydrogen electrode chamber and measure its electromotive force (hereinafter called E. M. F.) against the reference calomel electrodes and against the hydrogen electrodes in the unknown solutions. In other words, I desired to discover and eliminate some of the disadvantages of the hydrogen ion standards used theretofore and replace them with one or more standards substantially free from faults.

In searching for a hydrogen ion standard I busied myself primarily with basic salts of organic poly-bases, such as $NH_2CH_2CH_2NH_2HCl$, namely, ethylene diamine hydrochloride, and acid salts of organic poly-acids such as $$NaOOCC_6H_4COOH$$

sodium acid ortho phthalate. I chose especially those acids or bases having ratios of about 10:1 to 100:1 between the separate ionization constants so as to get smooth practically flat hydrogen ion titration curves, without large inflections, for expressing the relation between the degree of neutralization of the acid with a base and the $log10V_H$ value which is often called the pH of the solution. $V_H$ is the number of liters of solution containing one gram equivalent of hydrogen ions. With such smooth titration curves accidental inequalities or impurities of acid or basic character cannot make such variation in the pH values obtained during the preparation and use of such partly neutralized salts as H-ion standards.

As no exact pH or H-ion titration curves were then available I first used the ionization constants given by conductivities or other methods for a number of such polybasic organic acids and selected phthalic, malic, citric, succinic, malonic, tartaric and oxalic acids as the most promising. The actual pH titration curves which I later made are, except for oxalic acid, very smooth and show these acids to meet the conditions nearly exactly.

It is therefore clear that phthalic, malic, succinic, glutaric, tartaric, and citric acids give acid salts whose pH value in M/10 solutions are fixed for each but increase with dilution and differ among themselves and therefore form a series of pH standards.

I have found sodium acid phthalate one of the best of these standards for the following reasons. It can be made cheaply, easily, and pure from soda and orthophthalic anhydride or phthalic acid. It crystallizes with one molecule of water at times at low temperatures around 0° C. but precipitates at ordinary temperatures up to boiling with 0.5 molecule of water to form a very stable acid salt which keeps indefinitely, does not add or lose water in the air, but is dehydrated at 110° C. without further decomposition or formation of an anhydride of higher pH value. The anhydrous salt keeps dry indefinitely and has the same pH as the hydrated salt in M/10 solutions, namely about 3.95. The acid salt can be sterilized without decomposition in either the dry state or in solution by autoclaving at about 110° C. Its M/10 solution sterilized alone or with M/200 thymol keeps indefinitely.

The acid salt can be made readily in either of two ways. The phthalic anhydride can be boiled with water to form phthalic acid and treated with one equivalent of pure sodium bicarbonate or sodium hydroxide. The pH in M/10 solution should be 3.95. When the resulting solution is evaporated to crystallization and cooled the acid salt crystallizes out and more can be obtained by evaporation of the mother liquors. Another method is to boil the anhydride with about 4-5 parts of water and neutralize the resulting phthalic acid with exactly two molecules of sodium bicarbonate, or until a test drop of the boiled solution gives a faint pink color with phenol phthalein. Exactly the same weight of phthalic anhydride is then dissolved in this boiling solution of disodium phthalate and the solution is filtered hot from impurities when necessary and concentrated until the crystals of sodium acid phthalate begin to precipitate. The solution is then cooled, stirred and filtered. The crystals are then air dried and are pure but may be recrystallized if desired. The mother liquors on evaporation give more of the pure salt without any further chemical pH adjustment.

Figure 2:
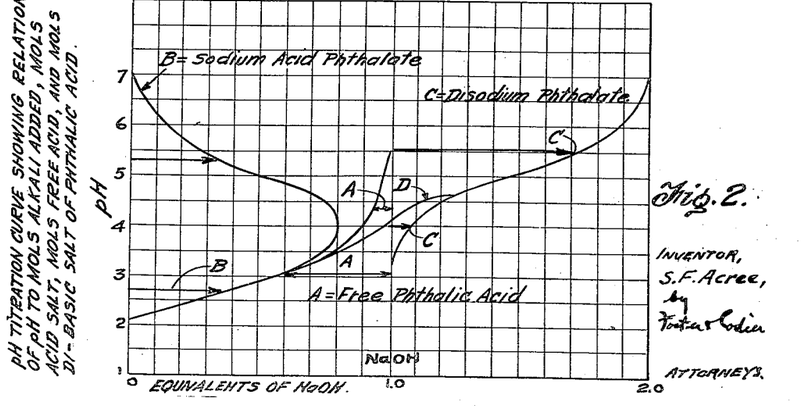
Fig. 2 shows how the addition of two moles of alkali to phthalic acid begins to form sodium acid phthalate, curve B, as the free phthalic acid, distance A, is used up. Finally the formation of disodium phthalate begins, curve C, and the sodium acid salt then decreases in concentration. The total curve BDC gives the relation of pH to moles alkali.

The hydrated or dehydrated salt may be used to make up standard solutions in my superpure $CO_2$-salt-free water or may be used to prepare standard mixed solid buffers. For example, 10 cc. portions of the solution M/10 (or M/1000) sodium acid phthalate sterilized with M/200 thymol (or with formalin, chloramines, etc.) may be treated with any desired volume of N/5 (or N/100) hydrochloric acid or sodium hydroxide up to one equivalent or more and diluted to 20 cc. and checked electrometrically to give a series of pH standards of any values (e. g., 0.2 pH apart) between pH 2.0 and pH 7.0 as shown in Fig. 5 of my application Ser. No. 624,277 (Fig 2 of the present case).

The sulphonphthalein indicators are the best series yet developed because they are soluble enough in water to form for example M/1000 solutions, other indicators such as phenolphthalein requiring for solution ethyl alcohol which interferes with the proper color reactions in pH work. In such aqueous solutions of, e. g. 0.04% concentration, the color is very intense red, blue or green, when two molecular equivalents of alkali are added, the first forming a yellow quinoidal salt and the second molecule of alkali forming the intensely colored quinone phenolate salt, according to the following equation:

The color used as an indication of pH values is in this case due to a mixture of two different color-bearing compounds. The intensely colored salts are not hydrated and decolorized by a small excess of alkali such as 3 to 5 moles used to convert the indicator completely into the intensely colored salt in testing its purity by a spectrophotometer. By making desirable chlor, brom, iodo, nitro, amino, methyl and other derivatives of the phenolic groups particularly, it is possible to vary the relative ionization constants of the phenolic and sulphonic groups and to vary the pH range in which the color changes take place, such as pH2 to 10 approximately. The purity of the indicator can be tested by titration with alkali to see what fraction of one molecule of alkali is necessary to change the yellow to the red color, for example, with phenolsulphonphthalein. Heretofore these monobasic indicator salts have been used as the standard indicator solutions (e. g., 0.04 per cent), without any adjustment of the pH as described herein for isohydric indicator tests. For example, 6 mgm. of the monosodium salt per cc. was used for injections into humans and the urine was collected and an aliquot portion made alkaline and compared against standard phenolsulphonphthalein in excess alkali to study the amount of phenolsulphonphthalein excreted as a measure of renal efficiency. Before my work the pH value of this solution was not adjusted to about 7.5 or close to the pH value of the blood stream or muscle tissues, that is, isohydric therewith. This pH 7.5 is about the midpoint adjustment in the useful range of this indicator. This adjustment should be done and can be by careful colorimetric comparisons while titrating the indicator solution with standard acid or alkali or can be done electrometrically. These adjusted solutions of indicator salts can be evaporated or the same composition can be made as described with other buffers by mixing the ratio of monobasic and dibasic indicator salts calculated from the pH titration curve of the indicator as described for nonchromophoric buffers. When dissolved in pure water these indicator salts give the correct pH calculated from and for their adjustment. These adjusted solid indicator salts can be mixed in standardized amounts with pure sodium chloride and molded in standard size indicator tablets to dissolve in, e. g., 10 or 20 cc. of pure water to give standard indicator solutions. Or these adjusted indicator salts can be mixed in standard amounts with buffers giving the same pH and molded in tablet or other form as standard buffer-indicator tablets to dissolve in e. g., 10 or 20 cc. of pure water to give standard buffer-indicator solutions of definite pH and color content. I find it very advantageous to prepare the indicator-salt mass separately, as outlined above for buffers, and having a higher concentration of indicator to correspond with the later dilution with the buffer mass. The buffer mass is then prepared for a given pH and mixed with the indicator-salt mass, and part of the mixture is pelleted. The true pH value of the finished mass is determined carefully electrometrically and colorimetrically and any small discrepancies in either indicator content or in pH value are adjusted by adding more indicator-salt or buffer mixture of the same or other necessary pH value as described under buffer tablets. When the entire indicator buffer mass is adjusted, it is pelleted and these tablets then contain the amount of indicator necessary to give the same color intensity as I obtain from a standard indicator tablet in a solution of the same pH value. It is therefore very convenient to have sets of these buffer indicator tablets varying about 0.2 pH units apart and covering any desired ranges such as those given by hexamethyl pararosaniline chloride (pH 0–3.1), thymolsulphonphthalein (pH 1.2–2.8), tetrabromphenolsulphonphthalein (pH 3.0–4.6), benzoylauramine (pH 4.5–5.5), o-carboxybenzeneazodimethylaniline (pH 4.4–6.0), o-carboxybenzeneazodipropylaniline (pH 4.8–6.4), dibromoorthocresolsulphonphthalein (pH 5.2–6.8), dibromthymolsulphonphthalein (pH 6.0–7.6), phenolsulphonphthalein (pH 6.8–8.4), orthocresol sulphonphthalein (pH 7.2–8.8), alpha naphtholphthalein (pH 7.2–8.7), thymolsulphonphthalein (pH 8.0–9.6), ortho cresol phthalein (pH 8.2–9.8), para-nitro-benzene-azo-salicyclic acid (pH 10.0–12.0), triphenylrosaniline sulphonic acid (pH 11–13), and alizarine blue sodium bisulphite (pH 12–14). It is possible that the salts or organic or other materials in industrial or natural liquids, urine, biological fluids, special soil waters, etc., etc., may have a particular influence on the colors of the specific indicators and make the colorimetric readings seem different from the electrometric pH values. These differences are called salt or protein errors. It is in such cases possible by my methods to adjust the indicator content and pH value of the standard indicator tablets and buffer-indicator tablets to overcome these discrepancies and give useful tablets which will give true pH values independent of the specific influence of the particular disturbing compound or compounds in the solution under test. All of these indicator tablets or buffer tablets or buffer-indicator tablets or ampoules of the indicators standardized in amounts and pH values, such as the phenolsulphonphthalein at pH7.5 for renal tests, can be sterilized by heating in vials at 110° C. on three successive days for use in sterile water, culture media, or other solutions whose ph is to be tested and/or regulated.

My M/1000 or M/2000 sulphonphthalein indicators of the same pH values diluted therewith to about M/50,000 indicator strength make excellent pH-indicator standards free from salt errors. For example, I can adjust these sulphonphthaleins, or other similar indicators, to any desired series of pH values in the range of each indicator by dissolving them in pH 7 CO$_2$-salt-free superpure water to make M/1000 or M/2000 solutions and titrating portions of them (e. g., 100 cc.) with standard N/10 acid or alkali while making careful colorimetric comparisons thereof against a set of companion micro buffer-color standards of the same desired pH series; or the adjustment can be done electrometrically with a hydrogen electrode or quinhydrone electrode. I can thus make a series of standard M/1000 or M/2000 solutions of any indicator 0.2 pH apart and covering the useful pH range of that indicator. In the claims and elsewhere, unless otherwise specifically noted, the word "adjusted" and related nouns and verbs are intended to mean that the colorless buffers and the colored or chromophoric (color bearing) buffers called indicators are treated in known amounts with known amounts of acid or alkali and thereby "adjusted in pH value" by this described electrometric or colorimetric procedure to give a desired or predetermined pH value, which in certain cases is also freed from any errors due to salt errors or salt or protein effects. These indicators are chromophoric or color-bearing buffers whereas the usual phosphate, borate, phthalate and other colorless buffers are called non-chromophoric or non-colored or non-color bearing buffers.

By diluting successive small volumes of each of these standard adjusted indicator solutions (e. g., 0.2 cc.) with ⅕ to 1 volume of an isohydric buffer solution (i. e., of the same pH value) while adjusting the indicator pH values, a comparison series of accurate buffer-color "micro" standards of any desired buffer concentration (M/10 to M/1000) is made for checking 0.2 cc. portions of the corresponding M/1000 or M/2000 indicator solutions themselves during adjustment as above; both solutions are viewed in sufficiently thin layers in small 1 cc. Pyrex dishes, or stoppered Pyrex test tubes laid on their sides, and through the same cross section in accordance with Beer's law. These "micro" buffer-color standards are also used when testing small quantities of unknowns with e. g., 0.2 cc. portions of the adjusted series of the same indicator.

In the adjustment of the pH values of the standard sulphonphthalein indicator solutions themselves it is convenient to dissolve 0.1 gram in one equivalent of alkali to neutralize the sulphonic acid group (e. g., with a standard alkali such as M/20 sodium hydroxide) and then dilute this solution to 0.02 or 0.04 percent or M/1000 or M/2000 or any other concentration desired. Such a solution has a pH value at or near the lowest useful pH of the indicator, with the exception of very acid indicators like tetrabromphenolsulphonphthalein (brom-phenol-blue) which requires only a half equivalent of alkali. Amphoteric indicators like the hydrochloride of methyl red (para-dimethylamino-azo-benzene-ortho-carboxylic acid) require one molecular equivalent of alkali to neutralize the HCl group and give approximately the lowest useful pH value. Portions (e. g., 100 cc.) of these standard indicator solutions are then adjusted in pH values by the careful addition of further volumes of N/20 sodium hydroxide and checking against the "micro" buffer-color standards described herein. It must be understood that commercial indicators vary in purity and that somewhat variable quantities of N/20 alkali will be required to give the same pH value with different sample of the same indicator. The following figures may be used to illustrate this principle with brom thymol blue, whose adjusted solutions I use to test the purity or pH value of the superpure pH 7.0 water made from my still described in this application and the pH values of weakly buffered solutions made from such water. I shall give the pH value sought, the theoretical number of cc. of N/20 alkali required per 0.1 gram of the indicator, and the number of cc. found for different samples of the indicator. For pH 6.2, theory 3.61 cc.; found 3.45, 3.61, 4.10 cc. For pH 6.4, theory 3.84 cc.; found, 3.70, 3.84 cc. For pH 6.6, theory 4.13 cc.; found, 3.95, 4.13, 4.30 cc. For pH 6.8, theory 4.44 cc.; found, 4.20, 4.44, 4.80 cc. For pH 7.0, theory 4.80 cc.; found, 4.65, 4.80, 5.00 cc. For pH 7.2, theory 5.21 cc.; found, 4.95, 5.21, 5.15 cc. For pH 7.4, theory 5.53 cc.; found, 5.45, 5.53 cc. For pH 7.6, theory 5.79 cc.; found, 5.52, 5.79 cc. I have likewise found the amounts of alkali needed for each pH value of brom phenol blue, brom cresol green, brom cresol purple, brom thymol blue, cresol red, phenol red, methyl red, and corresponding derivatives of tetrachlor- and tetrabrom-sulphonphthaleins, and thereby prepared adjusted indicators from pH 3.4 to 9.0 in 0.2 pH steps. The above disclosed method enables anyone skilled in this art to adjust the pH of his own indicator solutions.

By diluting 0.2 cc. of each adjusted indicator solution 1:49 with any desired buffer such as M/10 to M/1000 sodium acid phthalate or other buffer adjusted to the same pH as the indicator, I obtained a series of accurate buffer-color "test-tube" or 10 cc. standards for making a colorimetric comparison and measurement of the correct pH value of any other buffered or unknown solution available in larger volume and also diluted 49:1 with the indicator of the same pH. This correct pH of even very dilute and weakly buffered unknown solutions including my superpure conductivity water will generally be obtained by one or two preliminary tests with the indicator adjusted at its lowest, highest, and mid-pH points and one final check on a separate sample of the unknown with the indicator having the pH given by the preliminary tests. I call this method my isohydric indicator method of using the adjusted pH series of any indicator together with the adjusted companion series of buffer-color standards. These indicator, buffer, and buffer-color standards are best kept sterile with M/200 thymol, formaldehyde, etc., preferably admixed therewith beforehand and included definitely in the pH adjustment.

These indicator solutions or any buffer solutions can be protected against changes by the carbondioxide (CO$_2$) of the air by the simple expedient of adding sufficient sodium carbonate and/or bicarbonate calculated to form in solution the concentration of CO$_2$ required for air equilibrium. The mass law equation $$CO_2 \times 3 \times 10^{-7}/H = NaHCO_3$$

or $$1.2 \times 10^{-5} \times 3 \times 10^{-7}/H = NaHCO_3$$

gives the concentration of sodium bicarbonate (NaHCO₃) in mols per liter needed for each concentration of hydrogen ions (H) to keep these solutions in equilibrium with the atmospheric $CO_2$ when $3 \times 10^{-7}$ is the ionization or activity constant of carbonic acid in the particular solutions. As discussed on page 6, column 1, line 44, through page 7, column 1, line 10, of this specification, this stabilization of solutions containing buffer materials against changes by atmospheric carbon dioxide can also result from the establishment of the proper carbonate-bicarbonate-carbon dioxide concentrations by simple aeration.

Figure 7:
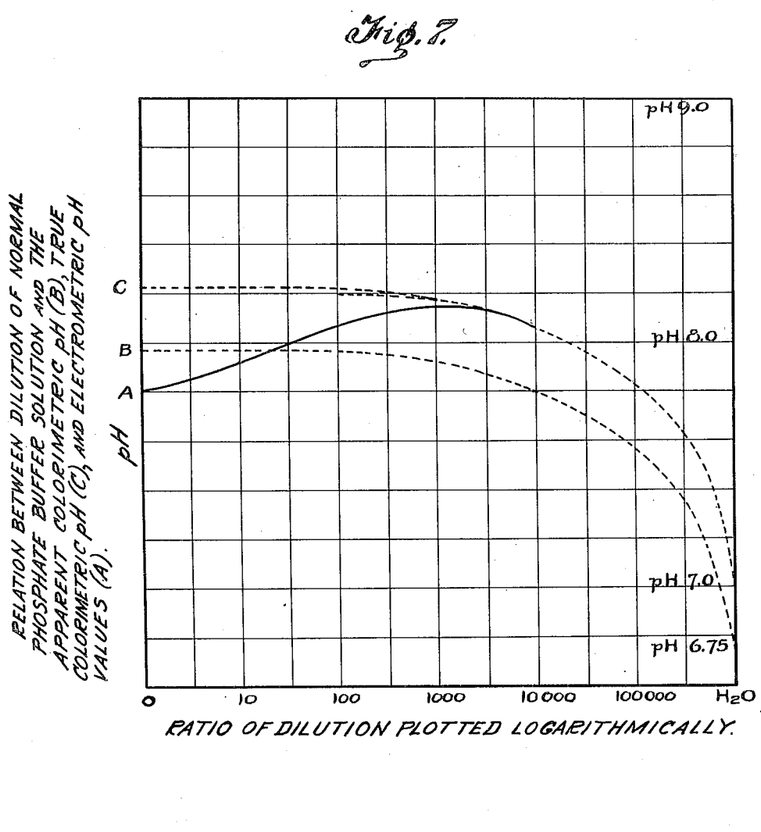
Fig. 7 shows that the electrometric pH of the phosphate rises on dilution, and crosses the colorimetric pH values obtained with 0.05 buffer-color standards. The 0.001 molar buffer-color standards would give the true colorimetric pH value of the diluted phosphate.

As illustrated in Fig. 7, curves A, B and C I have found that the usual M/10 to M/20 phthalate, phosphate, borate, etc., buffers give colors with sulphonphthalein indicators which correspond to pH values about 0.2–0.3 pH higher (but lower with methyl red in some cases) than the E. M. F. pH value, which abnormal colorimetic salt effect or salt error disappears with dilution to M/1000 or thereabouts, I have made buffer-color "micro" and test tube standards of M/1000 concentration or thereabouts which are free of salt errors for my tests against extremely dilute solutions and water, or I have made the proper corrections for salt errors while adjusting the pH of more concentrated M/10 to M/100 buffer-color standards for use in testing unknown solutions of M/10 to M/10,000 concentrations.

Figure 1:
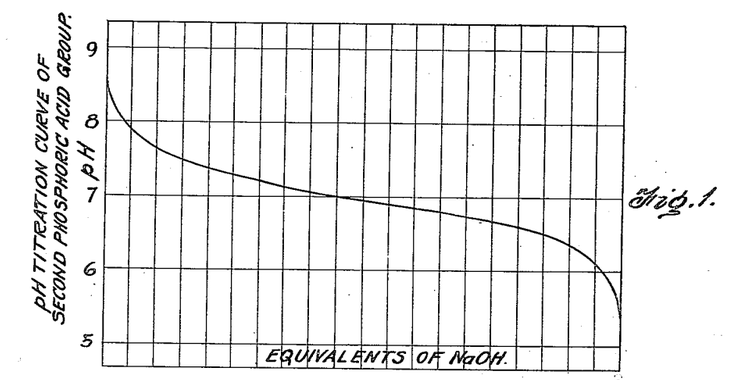
Fig. 1 illustrates the change in pH of the second acid group of phosphoric acid shown as ordinate, with change in mol fractions of alkali added to neutralize that acid group.
Figure 3:
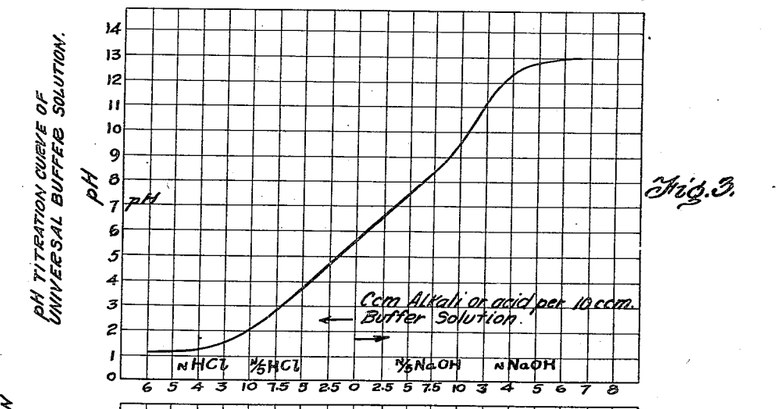
Fig. 3 shows how the pH of 10 cc. of universal buffer solution rises when treated with the indicated cc. of standard alkali and diluted to 20 cc., but decreases when treated similarly with standard acid.

The anhydrous sodium acid phthalate may be mixed with the proper quantities of phthalic acid and anhydrous disodium phthalate, as shown in the titration curve for phthalic acid, Fig. 5 in my application Ser. No. 624,277 (Fig. 2 of the present case), and ground and intimately admixed in a ball mill to give any desired mix for making small tablets in a pelleting machine or for use in larger quantities in industrial processes. By grinding about equal weights of these mixed phthalate or other buffers and sodium chloride in a ball mill the buffer tablets can be easily pelleted in any desired size such as 0.4 gram for solution in 20 cc. of water as a pH standard. It is easy to adjust these phthalate mixes to make buffer tablets for any desired pH in the range of phthalic acid, and hence to make a series of these buffer tablets 0.2 pH apart. Likewise these phthalate salts can be mixed with phosphate and borate salts in the proper proportions to make universal solid and liquid buffer mixes by the methods, and Figures 4, 5 and 6 given in my application Ser. No. 624,277 (Figs. 1, 2 and 3 of the present case).

For example, the sodium acid phthalate may be mixed with these predetermined quantities of solid phosphates, thymol, borates, pyrophosphates, phenolsulphonates, etc., or their solutions to give universal buffer solutions or universal buffer tablets or industrial-size mixtures, as set forth in the above application. Proper quantities of these materials with ionization constants decreasing in the ratio of about 1:10 to 1:100 give a smooth titration curve illustrated in Fig. 6 in Ser. No. 624,277 (Fig. 3 of the present case). By addition of the indicated volumes of N/5 alkali or acid to 10 cc. of such a sterile universal buffer solution and dilution to 20 cc., fixed pH and pH indicator standards can be prepared very quickly from such a chart. Likewise solid buffer tablets or mixes of these chemicals covering wide pH values can be made, e. g., pH 2 to 10. These universal buffer solutions and tablets can be premixed with accurate quantities of indicators already adjusted to the same pH, such as the sulphonphthalein salts, to give buffer-indicator mixtures suitable to the pH range of each indicator.

The theory of pH titration curves rests on the fact that when an acid is titrated with a base, the hydrogen ion concentration $C_H$ and the pH value ($pH = -\log_{10} C_H$) gradually change, the former decreasing and the latter increasing. The $C_H$ or pH can be measured by means of a hydrogen electrode or the standard indicators herein described. The relation between the fractional equivalents of alkali and the total hydrogen ion concentration (e. g., $C_H$, H-ion, or $H^+$ or $H_t$) and the ionization constant or constants of the mono- or polyvalent acid can be plotted in graphs and curves and expressed in equations. For example, the separation ionization constants of a polybasic acid like phthalic or citric acid can be measured by the use of the equations $$K_1 = \frac{H_t(\alpha K A n H_t + H_t)}{H_2 A n - K A n H_t - K_2 A n t - H_t}$$

and $$K_2 = \frac{H_t(\alpha' K_2 A n t + H_t)}{K O H_t - 2 K_2 A n t - H_t}$$

in which $K_1$ is the ionization constant of the first or stronger acid group, $K_2$ that of the second acid group, $\alpha$ the per cent of ionization of the total ionized and un-ionized acid salt called $KAnH_t$, $H_t$ the total hydrogen ion concentration, $H_2An$ the original concentration of the dibasic acid, $K_2Ant$ the total concentration of the ionized and un-ionized dibasic salt whose degree of ionization is $\alpha'$, and $KOH_t$ the total equivalent of alkali added.

In plotting the data for these equations in graphs and curves it is less convenient to plot $H_t$ than $\log H_t$ or $-\log H_t$ (i. e., pH). Figures 1, 2 and 3 represent three different ways in which the relation between pH and other data may be plotted. Fig. 1 shows the rise in pH ordinates when a monobasic acid with ionization constant $K = 10^{-7}$ is titrated with increasing fractions of an equivalent of alkali plotted as abscissae from right to left. Figure 3 shows the change in pH when 10 cc. of a universal buffer solution described herein are treated with the volumes of standard acid or alkali given as abscissae to right or left of the central zero mark. Figure 2 gives as ordinates the pH data for phthalic acid titrated with 2.0 equivalents of alkali plotted as abscissae from left to right. Curve AB gives pH versus equivalents of total acid salt, KHAnt. Curve A is the acid salt curve that would be obtained if the first acid group could be titrated before any neutralization of the second acid group. Curve C is the dibasic salt curve that would be obtained if the second acid group could be titrated by itself. Curve AC is the pH curve actually obtained because the second acid group is titrated along with the first acid group after about 75 per cent of the latter is neutralized. As indicators are merely color-bearing or chromophoric acids or bases, and hence form buffer salts, the pH curves such as Figs. 1, 2 and 3 apply equally well to indicators. It is noted that the ends of the pH curves for each acid group form sharp inflections and that only the middle 50 per cent is practically straight.

The theory and practice involving such buffer mixtures rest on the fact that during the neutralization of the last 25% of a given acid with a base the pH does not rise sharply as shown in curve A, Fig. 2, because the first part such as 25% of the neutralization of the next weaker acid or acids will also be taking place and whose pH will therefore be kept down as illustrated in curve C, Fig. 2. The actual pH titration curve will therefore be a resultant of the two or more individual pH titration curves as shown in Fig. 5 in Serial No. 624,277 and curve AC in Fig. 2 of the present case. Since the middle 50 per cent portion of the pH titration curve for each acid (or base) is practically a straight line the difficult part of the calculations and choice of buffer acids or bases is to use the mixtures whose overlapping ends of the pH curves will also give resultant practically straight lines forming continuations of the middle straight portions of the curves and hence practically a straight line through the useful part of the total curve as shown in Fig. 3. The choice of a mixture of buffer acids with suitably varying ionization constants should give a smooth pH titration curve throughout the entire neutralization of such mixture of buffer acids with bases, or similarly of buffer bases (amines, aminoacids, etc.) with acids; in other words there would be a gradual variation in pH, making such a single solution an excellent pH standard covering a wide pH range. A proper choice of such buffer mixtures can be so made, particularly by using fractions of molecular or equivalent quantities of the buffer acids or bases, that the resultant titration curve is a smooth or straight line titration curve. The addition of disinfectants such as thymol (preferably N/200) or para sulphonic acid carbolater (p-HOC$_6$H$_4$SO$_3$H), preferably M/10, may be used also to form part of the titration curve and also to keep the solution sterile to prevent changes in pH of the solution through bacterial action. Furthermore, neutral preservations such as 1-5% formaldehyde, chloramine derivatives, etc., may be used with success but boric acid solutions did not prove as permanent as was desired. This invention embraces the preparation of sterile, indefinitely stable universal buffer solutions of any desired pH values, from which any chosen number of standard solutions of definite pH values can then be prepared by the addition of standard acid or alkali, with or without water. It has proved desirable to use titration curves as set forth above, one of which is illustrated in Fig. 6, Serial No. 624,277, and Fig. 3 of this application, and is formed by plotting as abscissae the volumes of standard (e. g., N/1) alkali or acid against pH values as ordinates. By reference to the titration curve chart, a person without any chemical training can, in a moment, add to 10 cc. of the universal buffer solution the necessary volume of N/5 acid or alkali to make not only the usual pH standards differing by pH values of 0.2 but any other solutions of any desired pH value within 0.01, representing an unusually high order of accuracy. By making these solutions up to a constant volume, such as 20 cc. and adding an appropriate standard indicator tablet or other standard quantities of desired indicators, an excellent series of colorimetric standards is obtained. Any desired standard for a hydrogen electrode is also readily obtained. Formerly, in order to cover the desired range of pH values, for example from 2 to 10 in small increments (say 0.2 pH) it was necessary to take 10 cc. portions of a number (usually five or six) of buffer solutions, each of which covered a narrow pH range, and add successively increasing amounts of alkali (or acid). The result of the tremendous amount of labor and painstaking and accurate work was some forty solutions which quickly became useless because, being unsterile, they were soon (in from two to four weeks) rendered useless due to bacterial contamination which modified their pH values. A great advance in the art is thus made by replacing forty, deteriorating solutions by a single, reliable, sterile, indefinitely stable universal buffer solution of any desired pH value.

Many solutions have been made, tested and used for these properties, and the following are given as exemplary. A mixture of pyrophosphates, acetates, and formiates of sodium containing from 1-5% of formaldehyde was formed to remain sterile, but the pH value varied somewhat due probably to hydration of the pyrophosphate. A solution of N/10 disodium phosphate, N/20 sodium acetate, N/20 sodium formate, N/10 sodium sulphocarbolate, and N/200 thymol formed an excellent universal buffer solution which remained colorless, sterile and constant in pH value but its pH titration curve was not quite as near a straight line as was desired. An excellent mixture for most purposes was found to be that resulting from the solution of 110 grams of sodium formate, 844 grams of sodium phenolsulphonate, 663 grams of potassium dihydrogen phosphate, 440 grams of potassium acetate, and 30 grams of thymol in 44 liters of the purest water. The appended curve shown in Fig. 6, Serial No. 624,277 and Fig. 3 of the present case, is for such a solution.

Such a universal solution can be used in commercial operations or in analytical chemistry. In the latter case, by way of example, one of the constituents can be a phosphate, oxalate, sulphide, carbonate, etc., which will give desired precipitates with added metallic radicles at the proper pH value. Or, furthermore, the universal buffer solution may contain such metallic radicles combined with organic acids, singly or in mixture, the salts of these acids being soluble and suitable for giving any desired pH values; phosphates, carbonates, oxalates, sulphides, etc., can then be added to the universal buffer solution regulated to any pH value, in order to study and control the pH range of precipitation of such phosphates, hydroxides, etc. Similarly, the effect of pH values on oxidation-reduction reactions can be studied and used for their control, the oxidation-reduction agents themselves being buffers or not, as desired.

Figure 8:
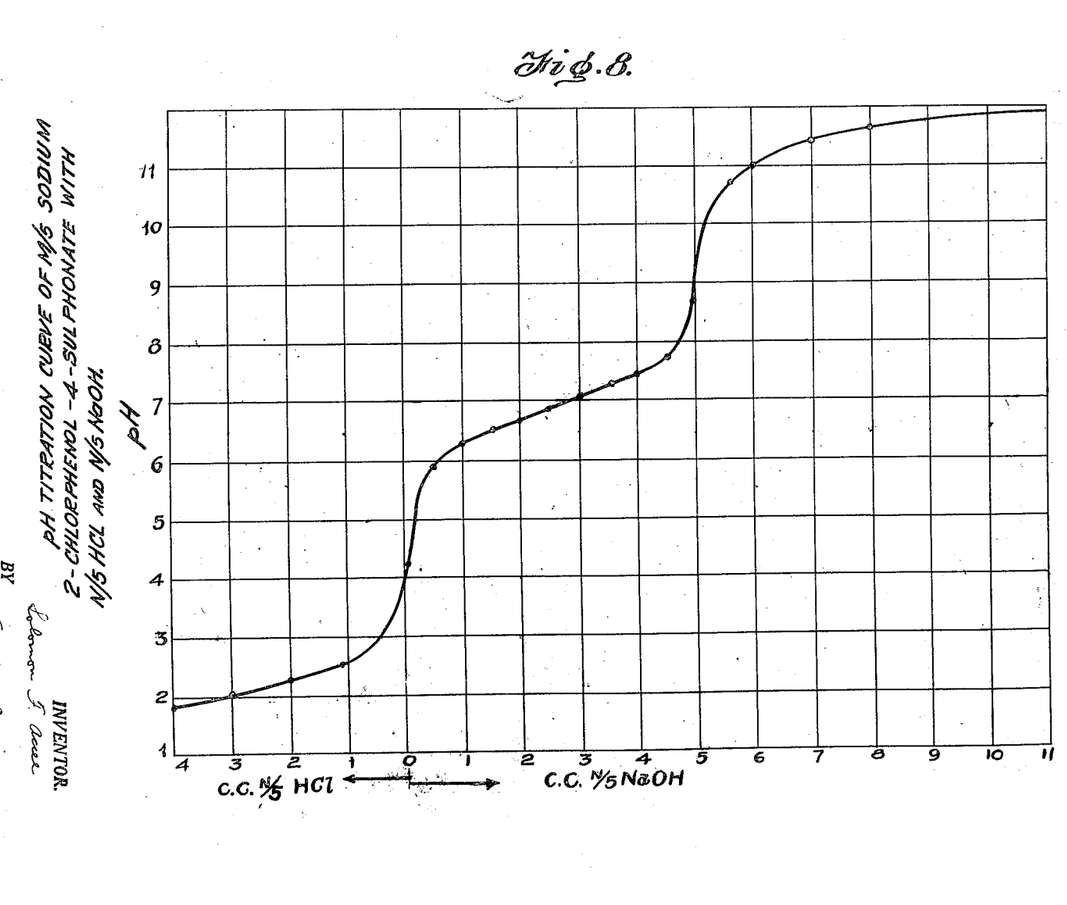
Fig. 8 shows the relation of the pH of 2-chlorphenol-4-sulphonic acid to its degree of neutralization in going from free acid to the sulphonate salt (up to pH 4) and then the phenolate salt (up to pH 9).

In the development of overlapping buffers covering the most useful pH ranges, pH 2-10, especially the alkaline ranges from pH 7 to 10, I have found that the dearth of suitable acids can be augmented admirably by the use of 1-phenol-4-sulphonic acid and the corresponding 1-phenol-2-chlor-4-sulphonic acid, 1-phenol-2,6-dichlor-4-sulphonic acid and 1-phenol-2,4-dichlor-6-sulphonic acid. Other similar compounds can be used in which the halogen or other negative groups cause an increase in the ionization constant and the lower the pH range of the phenolic group. Similarly the introduction of positive alkyl or amino groups ortho or para to phenolic groups decreases the ionization constant and raises the pH range. The introduction of one chlorine or bromine atom ortho to the hydroxyl group increases the ionization constant from about $10^2$ to $10^{2.5}$ fold or lowers the mid points of the useful pH ranges from about 1.8 to 2.5 units. Two chlorine or bromine atoms ortho to the phenolic group lower the mid points of the useful pH ranges about 4 pH units. For example, the curve in the annexed Fig. 8 shows that in titrating 20 cc. of M/20 sodium 2-chlorphenol-4-sulphonate with 5 cc. of N/5 alkali the useful pH range extends from about 6 to 8 or about 2 pH units lower than the pH range 8–10 covered by sodium phenol-4-sulphonate. Not only are these halogenated phenol derivatives very soluble but they are excellent for killing bacteria, lice, ticks, etc., and solutions thereof can be adjusted at any desired pH value for each phenolic derivative. The phenol group itself in each case covers a definite pH range characteristic of itself, and the pH regions covered by the sharp inflections between the sulphonic acid group and the phenolic group can be smoothed out and regulated by the addition to such phenolic substances of another buffer, in sufficient amount such as quantities equivalent to the phenolic group, whose characteristic pH range overlaps the sharp inflection pH range of the phenolic group. This principle is used in making my universal buffer solutions and tablets as set forth in Ser. No. 624,277.

The water used for making the dilutions or solutions of any of these buffers or indicators should be substantially free from even traces of carbon dioxide and buffer or neutral salts and hence should be pH water such as I prepare in my superpure water still. Unless the carbonic acid and carbonate-bicarbonic salts and other buffer materials present in ordinary tap water are absent in the distillate therefrom these chemicals change the pH of the phthalate and other buffer solutions as well as of the indicators and buffer-indicator mixtures diluted with such distilled water. The amount of the pH change depends upon the relative concentrations and ionization constants of these buffers and indicators and upon the pH and degree of neutralization of each.

Figure 4:
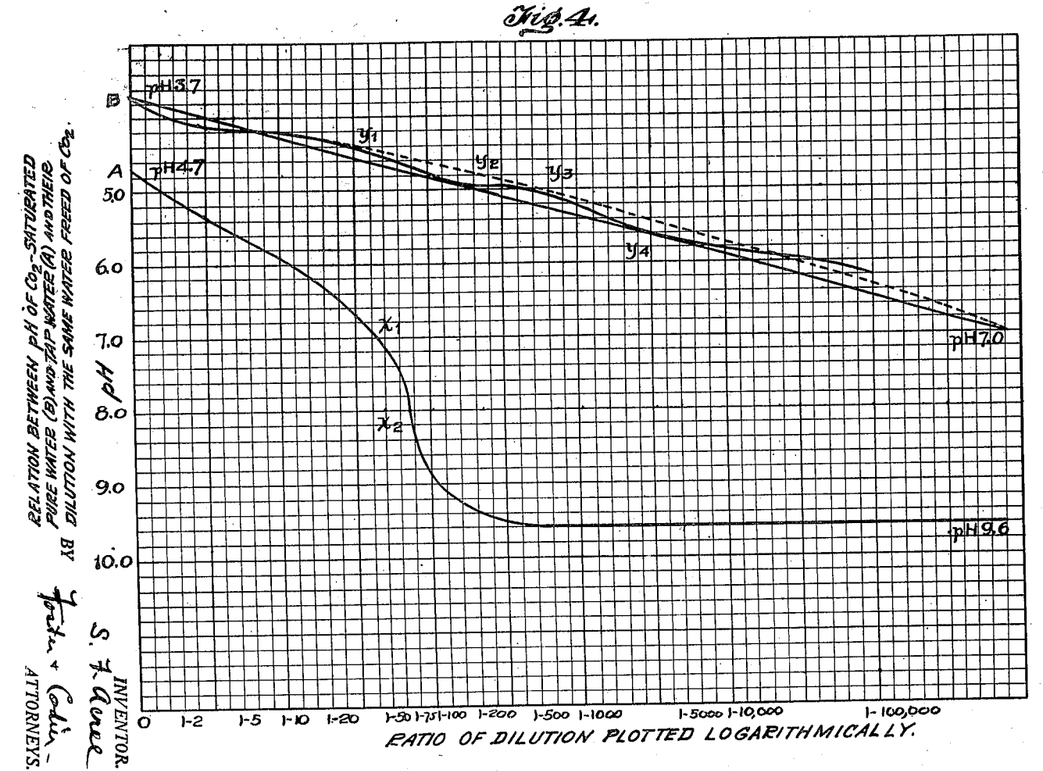
Fig. 4 shows how the 3.7 pH value of water saturated with $CO_2$ increases with dilution of the $CO_2$ with pure pH 7.00 water, and that similar changes take place when pH 4.7 tap water saturated with $CO_2$ is diluted with the same tap water freed of $CO_2$. The abscissae 1-2, 1-5, etc., indicate that one volume of the $CO_2$-saturated water is diluted two-fold, five-fold, etc.

Ordinary purified city water as well as neutral river waters contain free carbonic acid, carbonates, bicarbonates, lime salts, alkali metal salts, sulphates, chlorides, organic matter, sometimes free chlorine and other constituents all of which vary with the character of the country from which the water flows. Many of these chemicals are buffer materials in that they change the hydrogen ion concentration of acids, bases, acid salts, and basic salts. Fig. 4 shows two curves illustrating the effect of carbonic acid on tap water and on my superpure water and shows their difference in pH which is also equal to $$\log_{10}\frac{1}{C_H}=\log_{10}V_H$$

in which $V_H$ is the number of liters of solvent containing one gram equivalent of hydrogen ions $C_H$ is the concentration of the hydrogen ions and $\log_{10}$ is the usual expression for the logarithm on the base 10. The lower curve A expresses the relation between the pH (as ordinates) of a certain tap water saturated with carbon dioxide and the dilution thereof (as abscissae) by the same tap water free from free dioxide by passage therethrough of $CO_2$— free pure air until a constant pH of about 9.6 in this case is obtained. It is seen that this particular tap water has a pH value of 4.7 when saturated with $CO_2$ and that in the dilution the pH increases in nearly a straight line until a pH of 6.9 or 7.0 is obtained, which is also about the pH of this tap water when collected from the faucet. As this solution is diluted still further with $CO_2$— free tap water there is a sharp break upward in the pH until pH 9 or thereabouts is reached after which the pH curves slowly upward until a pH of about 9.6 is reached at a dilution of 1:500 to 1:1000 after which it remains constant at pH 9.6 on further dilution. It is noted that pH 8.1 is obtained when this tap water is in equilibrium with ordinary air and the carbon dioxide therein whereas superpure water gives a pH of 5.7 under the same conditions. Turning now to the upper curve B it is noted that superpure water gives pH 3.7 when saturated with carbon dioxide, gives pH 5.7 when in equilibrium with ordinary air and the carbon dioxide therein and gives pH 7.0 when thoroughly scrubbed with air freed from $CO_2$ by passage through a soda lime scrubber. The curve B (Fig. 4) shows all the pH values intermediate between 3.7 and 7.0 given by diluting a unit volume of superpure water saturated with carbon dioxide with the unit volumes of superpure $CO_2$— free water whose $\log_{10}$ values are shown as abscissae. It is seen that curve B has no sharp inflections shown in curve A because the superpure water has no basic buffer materials found in the tap water and of course partly neutralizing the carbonic acid to give the sharp inflection in curve A (Fig. 4) between about pH 7.0 and 9.0. The absence of this inflection in curve B proves beyond question that my method of preparation of the superpure water in my superpure still removes up to the last traces the buffer salts and carbonic acid present in the tap water used as a source of the superpure distilled water. This fact is further shown by reference hereinbelow to curves in Figs. 5, 6 and 7, giving the relation of the pH value to the dilution when phosphate and phthalate buffers or a culture medium such as Fermi's solution is diluted with ordinary distilled water having a pH of about 5 from the $CO_2$ and sprayed over salts therein or with pH 5.7 water obtained from my superpure water brought into equilibrium with ordinary air or with my superpure pH 7.0 water: the curves show clearly that the addition of solutions of indicators (adjusted 0.2 pH apart by my isohydric indicator method described above and illustrated in the curves) to these diluted buffer solutions indicates widely different pH values depending upon whether ordinary distilled pH 5.0 water, air equilibrium pH 5.7 water or superpure pH 7.0 water is used in the dilutions and also upon the addition of indicator having the same pH as the buffer solutions by my isohydric indicator method to get the correct pH of the buffer solution under test, see Fig. 5. The curves show further that the superpure distilled water is the only kind that will give correct results when I dilute biological or industrial or other liquors. The use of ordinary distilled pH 5.0 water or even of air equilibrium pH 5.7 water, heretofore called high grade conductivity water, begins to produce considerable errors at dilutions of 1:10 to 1:100 if the pH of the buffer solution is above about pH 5.0. It is only when the buffer solution is quite acid such as about pH 3.75 illustrated in Fig. 6 that no appreciable error is caused by the $CO_2$ in even ordinary distilled pH 5.0 water whereas considerable differences in pH readings are caused by the adjustment of the brom phenol blue indicator over its useful range of about pH 3.4–4.6 in intervals of 0.2 pH. This last fact shows the necessity in fine work of adjusting the pH of the indicator solution itself and using it in this isohydric indicator technique and also of using only superpure water of approximately pH 7.0 in all work on buffer solutions. This applies in all kinds of scientific and technical problems involving solutions for ore flotations, the manufacture of pure beverages, solutions of sugar during the refining processes and the tests of the small amounts of the buffer impurities remaining in such refined sugar, and tests on boiler waters, sewage, factory waste liquors, natural and purified drinking water, plant extracts, culture media like corn meal agar or other weakly buffered media and countless other scientific and industrial liquids. In testing all such dilute and weakly buffered solutions colorimetrically the indicator must be isohydric with the solution to which it is added, or have the same pH as the latter, to give the correct colorimetric pH value.

Figure 5:
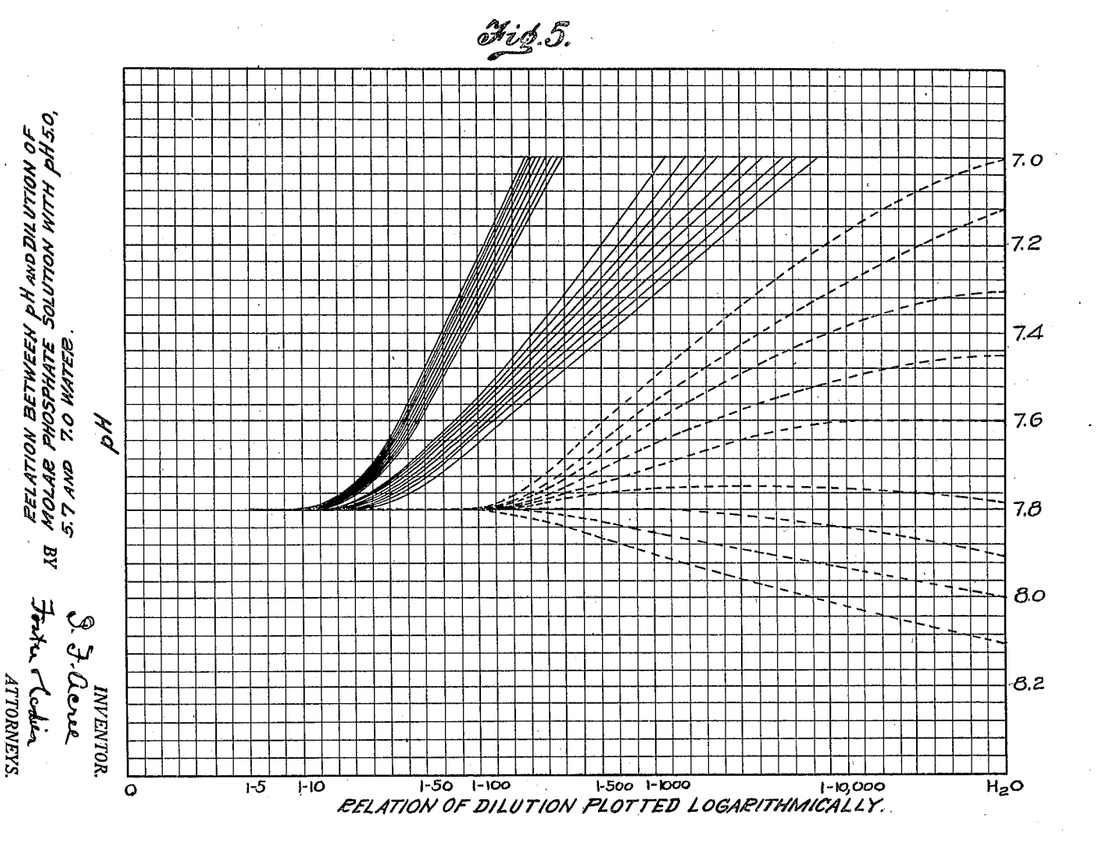
Fig. 5 shows that a molar disodium phosphate solution having a pH about 7.8 does not change appreciably in pH on dilution with pH 5.0, 5.7 or 7.0 water, but further dilution shows distinct zones of pH with the appropriate indicator such as phenol red adjusted in 0.2 pH steps from its lowest to highest useful pH values.
Figure 6:
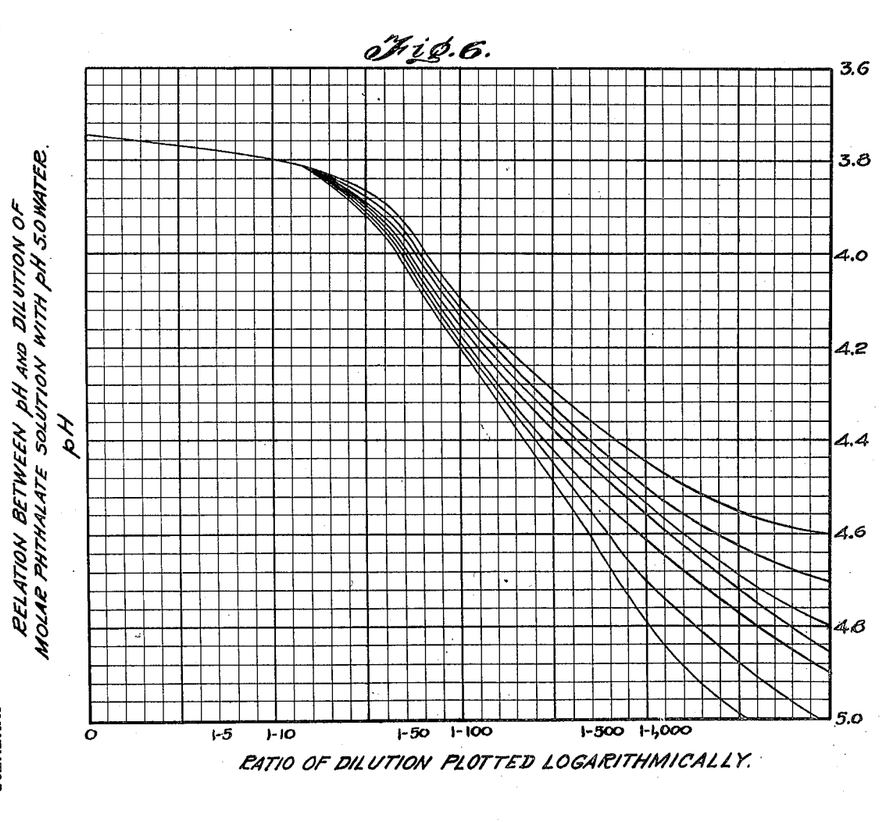
Fig. 6 shows that a molar potassium acid phthalate solution having a pH value about 3.75 is not changed materially by tenfold dilution with pH 5.0 water and use of bromphenol blue, pH 3.4 to 4.6 the indicator covering this range, adjusted in 0.2 pH steps. After 10 fold dilution the effect of the pH adjustment of the indicator is shown in the corresponding divergence of the pH when compared against pH standards, the pH 5.0 water gradually raising the pH.

The curves on Fig. 5 appended hereto illustrate how much purer and better the pH 7 water obtained in my superpure still is than air equilibrium of pH 5.7 water and how much better than pH 5.0 water. These curves show distinctly that pH 5 water has a great deal of carbon dioxide and gives very erroneous pH results in measurements of phosphate solutions diluted for comparative purposes, with pH 5 water, pH 5.7 water and pH 7 water. This also shows that the indicator solutions themselves must be adjusted and that entirely different readings are obtained with different adjustments of the same indicator; all three sets of curves show differences due to this adjustment of the indicator. With the use of the superpure distilled water having a pH 7.0 and an indicator having the same pH as the buffer with which it is mixed the correct reading can be obtained. The use of pH 5.0 water or air equilibrium pH 5.7 water gives entirely erroneous results whether the indicator is adjusted or not.

The term stabilized hydrogen ion standard or buffer standard is intended to embrace solutions or solids used for analytical, biological, medical, commercial or other purposes.

An indicator as herein used is a dye or colored compound with acid or basic buffer properties. In the claims the term buffer includes both colorless and color-bearing buffers.

What I claim is:

1. An indicator standard adjusted in pH value and in concentration which has a $CO_2$ content such that it is in equilibrium with the $CO_2$ of the atmosphere.

2. A sterile buffer standard adjusted in pH value and in concentration which has a $CO_2$ content such that it is in equilibrium with the $CO_2$ of the atmosphere.

3. A new sterile buffer hydrogen ion standard adjusted in pH value and in concentration and comprising a buffer disinfectant, an alkali metal carbonate and an indicator.

4. A new buffer hydrogen ion standard adjusted in pH value and in concentration and which comprises water, a buffer, an alkali metal carbonate, a buffer disinfectant and an indicator, the latter being previously adjusted in such a manner that it is isohydric with the said buffer.

5. The step of adding an adjusted indicator to a buffer solution which is isohydric therewith.

6. A buffer hydrogen ion standard adjusted in pH value and in concentration and which is substantially in equilibrium with the acid and basic buffer components of the surrounding atmosphere which affect hydrogen ion concentration.

7. A stable universal buffer adjusted as to pH value and concentration and comprising a plurality of substances which are capable of regulating hydrogen ion concentration in a solution, differing from one another in ionization constants, so as to give overlapping useful pH ranges and uniform changes in pH value upon the addition of uniformly increasing amounts of acid or alkali and said buffer containing $CO_2$ in an amount such that it is in equilibrium with the $CO_2$ content of the surrounding atmosphere.

8. In the process of determining the pH value of an unknown solution, the steps which comprise determining colorimetrically by preliminary tests with pH-adjusted indicators and comparisons with pH color standards the approximate pH value of small portions of said unknown solution, adding to another portion of the said unknown solution the pH-adjusted indicator having approximately the pH value of the unknown solution as indicated by the above said preliminary tests, and repeating until the pH value of the unknown solution has been determined within any desired fraction of a pH unit.

9. A process of preparing a series of indicators standardized as to pH and chosen concentration without added buffers which consists in adding to chosen concentrations of said indicators having useful colorimetric pH ranges between pH 0 to pH 14 the requisite amounts of standard alkali or acid and making comparisons thereof in thin layers by Beer's law against pH color standards to form a series of indicator standards varying from pH 0 to pH 14 by definite predetermined small increments.

10. The process of preparing a stable hydrogen ion standard susbtantially free from salt errors which comprises diluting a buffer to approximately one-thousandth molar (0.001 M) concentration and adjusting its pH to the desired value, and adding thereto an indicator of chosen contration and pH value, and air-equilibriating the resultant buffer-indicator mixture and adjusting its pH to the final desired value.

SOLOMON F. ACREE.